Dec. 12, 1944.     E. ERICSSON     2,364,781

PISTON SEALING DEVICE

Filed Oct. 19, 1942

Inventor
Elov Ericsson
By John E. Stryker Jr.
Attorney

Patented Dec. 12, 1944

2,364,781

UNITED STATES PATENT OFFICE 2,364,781

PISTON SEALING DEVICE

Elov Ericsson, St. Paul, Minn.

Application October 19, 1942, Serial No. 462,501

6 Claims. (Cl. 309—23)

This invention relates to a device for sealing pistons for pneumatic springs, shock absorbers and the like, and particularly to sealing devices of the general character described in my application Serial No. 287,563, filed July 31, 1939.

It is an object of this invention to provide novel means for preventing the loss of oil or other liquid or lubricant contained in the cylinder while affording efficient lubrication and returning lubricant from the walls of the cylinder to a piston recess or reservoir.

The invention will be best understood by reference to the accompanying drawing in which.

Figure 1:
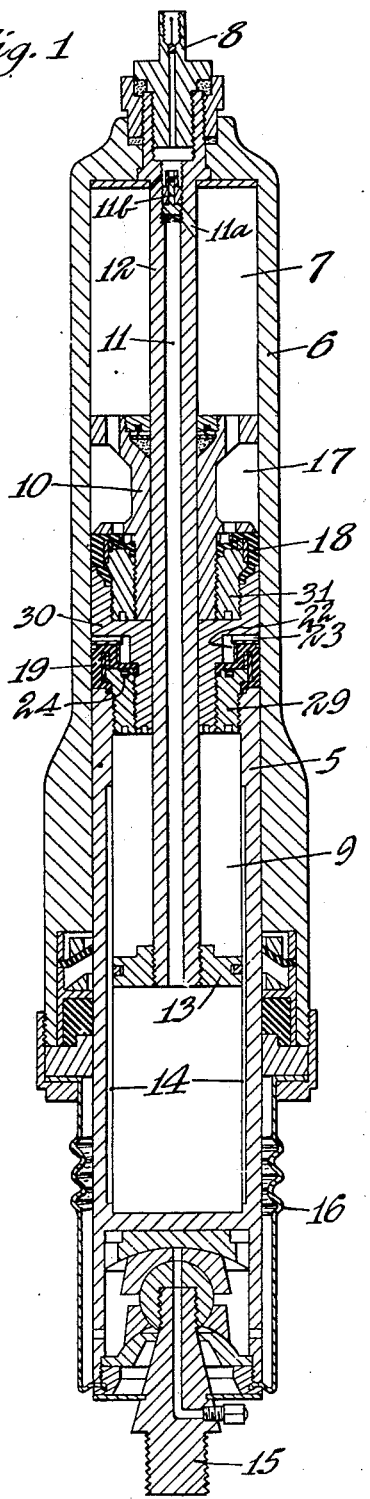
Figure 1 is a central vertical section through a cylinder and piston provided with my improved sealing device.
Figure 2:
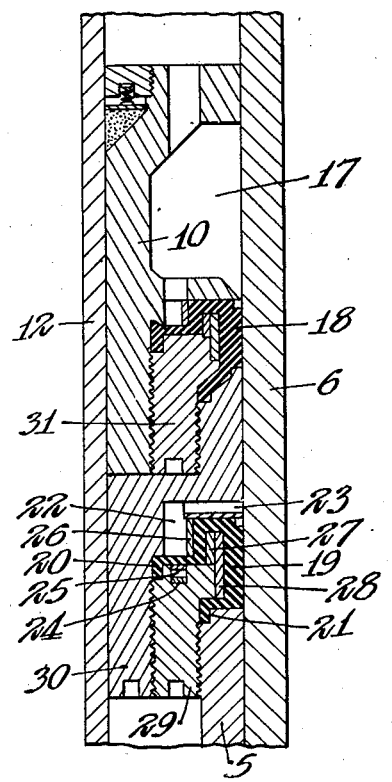
Fig. 2 is a fragmentary section on a larger scale showing details of the invention.
Figure 3:
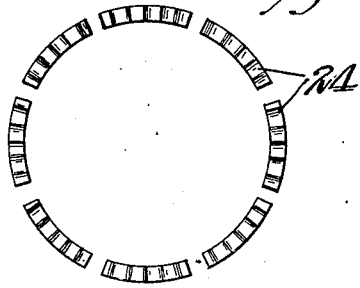
Fig. 3 is a plan view of the arcuate leaf spring members.
Figure 4:
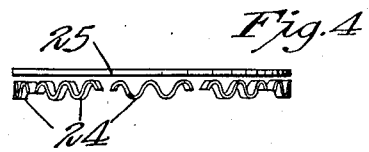
Fig. 4 is a side view of said members together with the overlying contact ring or bearing member.

As illustrated, my device is mounted on a piston indicated generally by the numeral 5 which is slidable in a cylinder 6 having a chamber 7 into which air or other gas under pressure may be charged through a valve 8. The piston 5 is hollow having a chamber 9 and a head indicated generally by the numeral 10. The chambers 7 and 9 are in communication with each other through a passage 11 extending axially through a tube 12 which is fixed on the upper end of the cylinder 6 and extends axially through a central bore in the piston head 10. Near its upper end the tube 12 communicates with chamber 7 through a passage 11a which is restricted by an adjustable plug 11b. At its lower end the tube 12 is fitted with a disk 13 fitting the walls of the chamber 9 to cushion the rebound of the piston in use. The air or other gas in the chamber 9 passes from one side of the disk 13 to the other in longitudinal grooves 14 formed in the interior of the piston walls but these grooves terminate a short distance below the upper extremity of the chamber 9 to prevent contact between the disk and end of the chamber. To connect the lower end of the piston to the mechanism to be controlled, a stud 15 is provided and the body of the cylinder 6 may be secured to the frame or relatively movable mechanism. Enclosing the projecting portion of the piston to protect it against accumulations of dirt or other foreign matter is a flexible cover 16 having one end connected to the lower end of the cylinder and the other end fastened to the lower end of the piston.

Formed in the head 10 is a chamber 17 for oil which is held under pressure by the air or other gas in the chamber 7. Immediately below the chamber 17 is a compressible sealing member 18 preferably of the character described and claimed in my application Serial No. 287,563. This member is expanded against the cylinder wall by the pressure exerted in the high pressure chamber 17, but allows some oil to be forced down along the cylinder walls thus affording efficient lubrication and improving the seal. By the present invention I guard against loss of the oil forming this lubricating film.

Mounted in the piston wall below the sealing member 18 is a second sealing member, indicated generally by the numeral 19, formed from rubber or rubber-like compressible material and having a skirt portion extending along the cylinder wall and flanges 20 and 21 projecting in from its upper and lower extremities respectively. The inner peripheries of these flanges are tightly gripped between metal parts of the piston head, as hereinafter described. The upper flange 20 is offset downward to afford an annular recess 22 which is in communication with the outer periphery of the piston and cylinder wall by means of a plurality of radially extending perforations 23. These perforations are spaced slightly above the upper end of the sealing member 19 to allow lubricant to pass to and from the recess 22 which functions as a reservoir for the lubricant.

Immediately below the flange 20 and recess 22 is a small annular air chamber containing a series of arcuate spring members 24 and an overlying contact ring 25. Each of the spring members 24 comprises a thin band of spring metal which is preferably of sinuous form and adapted to resiliently support the overlying ring 25 and flexible flange 20, thus allowing the recess 22 to expand or increase its capacity to receive oil under pressure which would otherwise be forced past the member 19, as hereinafter more fully described.

To control and distribute the pressure exerted by the member 19 against the wall of the cylinder, I provide an arrangement of split rings like that described and claimed in my application Serial No. 287,563. These include a ring 26 forming the outer wall of the chamber 22 and rings 27 and 28 operating against the inner or low pressure face of the member 19 to distribute the radial pressure thereon from within. The piston head 10 and sealing members 18 and 19 are connected to the upper end of the piston 5 by a series of concentric threaded members 29, 30 and 31, the latter having a threaded connection with the lower end portion of the head 10 and the member 29 having a similar connection with the tubular piston body.

In operation, under the varying thrust exerted on the piston, the latter is given reciprocating motion within the cylinder and the fluid pressure in the latter normally returns the piston to a predetermined position in which it may remain for a considerable period of time. During such periods of rest and even when the piston is in motion some oil is forced from the chamber 17 past the upper sealing member 18 and down along the cylindrical walls until it reaches the sealing member 19. Some oil enters the annular recess 22 through the radial perforations 23 to fill the same and transmit pressure which is directed radially outward upon the expansible ring 26. This pressure is transmitted to the member 19 by the rings 27 and 28. The resulting expansion of member 19 further limits the escape of liquid toward the low pressure end of the cylinder.

During the subsequent upward movement of the piston in the cylinder the oil is wiped from the cylinder wall with considerable force by the sealing member 19 and cannot escape rapidly upward because of the sealing member 18. Such additional oil is forced through the radial perforations 23 into the chamber 22 which is allowed to expand and receive it due to the compression of the leaf springs 24 under the increased pressure. The oil which is thus forced into the expanding chamber 22 is retained above the sealing member 19 instead of being forced down past that member. Upon the return or down stroke of the piston pressure along the cylinder wall above the sealing member 19 is partially relieved with the result that the leaf springs 24 expand and force out some oil from the chamber 22 against the cylinder wall surfaces between the sealing members 18 and 19. It will thus be evident that my device prevents the pumping out of the oil along the cylinder walls by producing a reverse pumping action and affording a more effective seal.

The amount of oil which passes to and from the annular recess 22 through the radial perforations 23 is small and consequently only slight compression and expansion of the leaf springs 24 in the annular air chamber beneath the flange 20 is required. Ordinarily, pressures on the order of several hundred pounds per square inch are carried in the chamber 7 and the leaf springs 24 must be designed to permit slight deflection under the corresponding pressures in the annular recess 22 while the contact ring 25 affords a continuous support for the flexible flange 20 above the springs.

Having described my invention, what I claim as new and desire to protect by Letters Patent is:

1. In combination with a piston, an annular expansible sealing member embracing the piston near its high pressure face, a second sealing member embracing the piston in spaced relation to said first mentioned sealing member, a recess for liquid formed in the piston, a separate chamber, a flexible member separating said chamber from said recess and a metallic spring confined in said chamber and subject to pressure in said recess for permitting expansion of said recess to receive additional liquid, said recess being in communication with the outer periphery of the piston between said sealing members.

2. In combination with a piston, an annular expansible sealing member embracing the piston near its high pressure face, a second sealing member embracing the piston in spaced relation to said first mentioned sealing member, a recess for liquid and a separate chamber, formed in the piston, a flexible member separating said chamber from said recess and resilient, compressible means confined in said chamber and subject to pressure in said recess for permitting expansion of said recess to receive additional liquid, said recess being in communication with the outer periphery of the piston between said sealing members.

3. In combination with a piston, an annular expansible sealing member embracing the piston near its high pressure face, a second sealing member having a skirt embracing the piston in spaced relation of said first mentioned sealing member, an annular recess for liquid formed in the piston and second sealing member between said members, said skirt being expansible outward and subject to radial pressure in said recess, a chamber separated from said recess by a flexible portion of said second sealing member and resilient, compressible means in said chamber subject to pressure in said recess for permitting expansion of said recess to receive additional liquid, said recess being in communication with the outer periphery of the piston between said sealing members.

4. In combination with a piston, an annular expansible sealing member having a skirt embracing the piston and a flexible, annular flange projecting inward from said skirt, an annular recess for liquid formed in the piston adjacent to said flange, an annular chamber separated from said recess by said flange and resilient compressible means confined in said chamber and subject to pressure in said recess for permitting expansion of said recess to receive additional liquid, said recess being in communication with the outer periphery of the piston.

5. In combination with a piston, an annular expansible sealing member having a skirt embracing the piston and having a flexible annular flange projecting inward from said skirt, an annular recess for liquid formed in the piston adjacent to said flange, an annular chamber separated from said recess by said flange and an arcuate leaf spring confined in said chamber and subject to pressure in said recess for permitting expansion of said recess to receive additional liquid, said recess being in communication with the outer periphery of the piston.

6. In combination with a piston, an annular expansible sealing member embracing the piston near its high pressure face, a second sealing member having a skirt embracing the piston in spaced relation to said first mentioned sealing member and having a flexible annular flange projecting inward from said skirt, an annular recess for liquid formed in the piston adjacent to said flange and between said sealing members, an annular chamber separated from said recess by said flange and resilient, compressible means confined in said chamber and subject to pressure in said recess for permitting expansion of said recess to receive additional liquid, said recess being in communication with the outer periphery of the piston between said sealing members

ELOV ERICSSON.